United States Patent Office 2,853,179
Patented Sept. 23, 1958

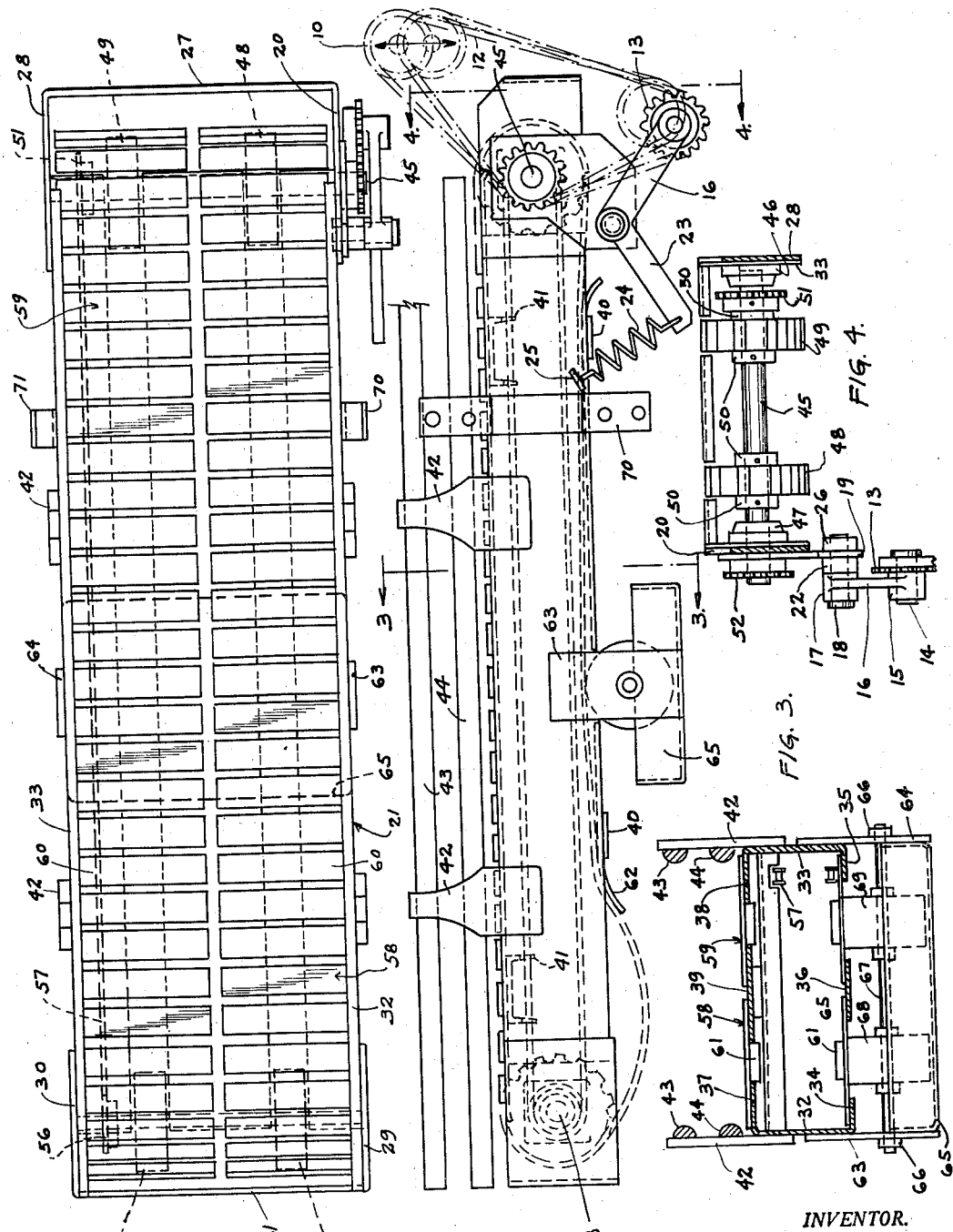

2,853,179

CONVEYOR APPARATUS AND DRIVE THEREFOR

Allan A. Norin, Chicago, Ill., assignor, by mesne assignments, to Geo. J. Meyer Manufacturing Co., Cudahy, Wis.

Application December 12, 1955, Serial No. 552,574

5 Claims. (Cl. 198—203)

This invention relates to conveyor apparatus and drive therefor, and more especially to an apparatus of this character useful in receiving containers such as bottles that have been unloaded from a case for transporting those bottles to a location remote from the case unloader apparatus. The conveyor apparatus, and more particularly the drive therefor, are adapted to be coordinated with a case unloader and with its drive means in a manner such that the conveyor drive readily accommodates changes in the position of certain of the case unloader components automatically and without attention of an operator.

An object of this invention is to provide a conveyor apparatus adapted to carry bottles and similar containers from one position to another, and in which the endless conveyor is lubricated automatically in its path of travel. Another object is in the provision of a container adapted to be filled with a lubricating material that is positioned adjacent an endless conveyor, preferably intermediate the ends thereof, and along the path of return travel of the conveyor, and wherein lubricator wheels have a portion thereof rotating within the lubricant within the container and a surface portion thereof engaging the underside of the conveyor to deposit lubricant thereon from the container.

Still another object is in the provision of an endless conveyor entrained at opposite ends about sprocket wheels, one of the sprocket wheels being rotatably carried on a support shaft and the other being fixed to a support shaft, and wherein means are provided to drivingly interconnect the two shafts and to rotate the shaft having the sprocket rotatable thereon which is located at the inlet end of the conveyor. A further object of the invention is in the provision of a drive for the conveyor that automatically accommodates a shift in the location of the power source for driving the conveyor. Yet a further object is to provide in conveyor apparatus of the character described a bell crank carrying a take-up and guide sprocket that is biased in one direction and that is movable against the biasing force to accommodate a change in the position of the drive sprocket that powers the chain entrained about the guide roller so that the chain is maintained in driving engagement with the driven sprocket for rotating the endless conveyor. Additional objects and advantages will become apparent as the specification develops.

Embodiments of the invention are illustrated in the accompanying drawing, in which—

Figure 1 is a top plan view of conveyor apparatus embodying the invention; Figure 2 is a side view in elevation of the conveyor apparatus shown in Figure 1; Figure 3 is a transverse sectional view taken along the line 3—3 of Figure 2; and Figure 4 is a vertical sectional view taken along the line 4—4 of Figure 2.

Conveyor apparatus embodying the present invention is especially suited for use in conjunction with bottle handling equipment such as a half-depth case unloader. In bottle handling equipment of such character, adjustment is frequently provided so that the handling apparatus may be made to accommodate bottles of various sizes. This ordinarily requires that certain components of the handling apparatus be shifted in position. In certain apparatus with which the conveyor is used, it is advantageous to drive the conveyor through a drive sprocket carried by the shiftable or adjustable components of the handling apparatus, and in the drawing (particularly Figure 2 thereof) the drive sprocket 10 is movable along the path of the arrow adjacent thereto, and is secured to a power driven shaft 11 that may be considered as being carried on the movable components of bottle handling apparatus such as a half-depth case unloader.

Entrained about the drive sprocket 10 is an endless link chain 12 that at its lower end is entrained about a guide and take-up sprocket 13. The sprocket 13 is carried for rotation on a stub shaft 14 journaled in a bearing 15 provided by an arm 16 having a bearing 17 at its opposite end secured to a stub shaft 18 journaled for rotation in a hanger plate 19 rigidly affixed to the side wall 20 of a frame 21 provided by the conveyor apparatus. Also secured to the shaft 18 is an enlarged boss or bearing 22 carried by an arm 23 that defines with the arm 16 a bell crank. The arm at its other end is secured to a helical spring 24, that at its opposite end is anchored to a bracket 25 rigidly secured to and carried by the side wall 20 of the frame 21.

It will be appreciated that with the arrangement provided, movement of the drive sprocket 10 along the path of the arrow will cause the bell crank arrangement 16–23 to pivot about the longitudinal axis of the shaft 18, whereby the guide and take-up sprocket 13 will move generally along the path of the arrow, which is the path of movement of the drive sprocket 10. As is apparent from Figure 4, the shaft 18 may be secured in position within the hanger plate 19 by a nut or clamp collar 26.

Referring now to Figure 1 in particular, it is seen that the side wall 20 of the frame is adjacent one end of the conveyor assembly (the right end as viewed in Figures 1 and 2, or in-put end), and it merges with a transversely extending frame member 27 that is formed integrally with a side wall member 28 that corresponds to the wall member 20 and is positioned along the opposite side of the assembly. The members 20, 27 and 28 define a generally U-shaped frame segment. A corresponding frame segment is positioned at the opposite end of the assembly, which is the discharge end thereof. This frame segment comprises side wall portions 29 and 30 formed integrally with a transversely extending wall portion 31.

The wall portions 20 and 29 are rigidly secured to a longitudinally extending side wall 32, and similarly, the wall portions 28 and 30 are rigidly secured to a longitudinally extending side wall 33. As is seen in Figure 3, the side walls 32 and 33 are turned inwardly at their lower ends to form, respectively, bottom wall sections 34 and 35 having interposed therebetween and in spaced relation therewith a center bottom wall section 36. A corresponding arrangement is provided along the top of the side walls 32 and 33 which are turned inwardly, respectively, to provide the top wall sections 37 and 38 that are in spaced, parallel alignment with the sections 34 and 35. Interposed between the sections 37 and 38 is a central section 39.

The sections 34, 35 and 36 along the bottom of the conveyor are rigidly secured together by transverse supports 40 (Figure 2), and the sections 37, 38 and 39 are rigidly secured together by inverted U-shaped channel supports 41. Extending upwardly from the side walls 32 and 33 are standards or supports 42 that, as is seen in Figure 2, have generally the shape of a bottle. The standards 42 are spaced apart longitudinally along the frame 21 and carry guide rails 43 and 44 which are oriented in spaced apart, parallel alignment and are preferably semicylindrical in shape, as is apparent from Figure 3. The standards 42 may be secured to the side walls 32 and 33 by any suitable means, such as by welding, and the guides 43 and 44 may be similarly secured to the standards.

Extending transversely across the conveyor apparatus at the inlet end thereof is a shaft 45 that is journaled for rotation in bearings 46 and 47 which are carried by the side walls 32 and 33 of the frame. Rotatably supported on the shaft 45 are sprockets 48 and 49 that are aligned, respectively, with the longitudinally extending channels or slots defined between the side sections of the top and bottom walls of the frame and the central sections thereof—or more specifically, between the members 37–39 and 34–36, and 38–39 and 35–36. Though the sprockets 48 and 49 are rotatable with respect to the shaft 45, they are longitudinally positioned thereon by clamp collars 50 which are secured to the shaft by set screws or other appropriate means.

Adjacent the sprocket 49 is a drive sprocket 51 that is secured to the shaft 45 to prevent relative movement therebetween by a set screw or other appropriate arrangement. The shaft 45 projects outwardly beyond the wall 32 and wall portion 20 of the frame, and at its outer end carries a driven sprocket wheel 52 that is secured to the shaft so as to prevent relative rotation therebetween. It will be apparent that when the driven sprocket wheel 52 is rotated, the shaft 45 will rotate as well as the sprocket wheel 51 secured thereto.

Adjacent the discharge end of the conveyor is a shaft 53 extending transversely thereacross that is supported for rotation within suitable bearings carried by the side walls 32 and 33 of the frame. Rigidly secured to the shaft 53 are a pair of sprockets 54 and 55 that are in longitudinal alignment, respectively, with the sprockets 48 and 49 heretofore described. Adjacent the sprocket 55 and in longitudinal alignment with the sprocket wheel 51 is a sprocket wheel 56, and entrained about these sprocket wheels is a link chain 57 whereby the sprocket wheels rotate together as do the shafts 45 and 53 to which they are rigidly secured.

Entrained about the sprockets 48 and 54 is an endless conveyor 58, and about the sprockets 49 and 55 is entrained an endless conveyor 59. The conveyors 58 and 59 may be formed by a plurality of links 60 that are pivotally secured together in a well known manner, and which carry depending teeth 61 (Figure 3) that are adapted to engage and mesh with the teeth provided by the sprockets 48, 49, 54 and 55. Through this arrangement, the endless conveyors 58 and 59 are rotated by the sprockets. The metal link conveyors may be conventional, and since well known in the art will not be further described herein.

As is most apparent from Figure 2, the endless conveyors 58 and 59 on the return or bottom pass thereof are drawn over a support guide 62 having ends that curve downwardly so as to facilitate movement of the endless conveyors thereover. The support guide 62 is positioned intermediate the ends of the conveyor apparatus, but terminates spaced distances from those ends. Intermediate the ends of the support guide 62, secured to the side walls 32 and 33 and depending therefrom, are carrier supports 63 and 64 that support and have secured thereto a container 65 having an open top. Journaled for rotation in bearings 66 provided by the supports 63 and 64 is a shaft 67 having mounted thereon in spaced apart relation a pair of applicator wheels or rollers 68 and 69. These rollers, respectively, are in alignment with substantially the center portions of the conveyors 58 and 59 and are positioned so as to ride along those conveyors on the return leg thereof as they rotate about the sprockets at the respective ends of the conveyor apparatus. The container 65 is adapted to receive a liquid therein for lubricating the conveyors; and while any of a number of suitable lubricants may be employed, as an example, soapsuds may be set forth. The vertically extending members 70 and 71 may be employed in mounting the conveyor on appropriate supports therefor.

In operation of the apparatus, the drive sprocket 10, or the shaft 11 to which it is secured, is positively driven by a motor or other prime mover, and through the link chain 12 entrained thereover positively drives the driven sprocket 52 through engagement therewith. The sprocket wheel 52 in turn rotates the shaft 45 of the sprocket wheel 51 pinned thereon, which then through the endless link chain 57 drives the sprocket wheel 56 and the shaft 53 to which it is secured. The sprocket wheels 54 and 55 are then positively driven by the shaft 53, and the endless conveyors 58 and 59 are rotated from right to left along the top side of the apparatus as viewed in Figure 2, and from left to right along the bottom or return leg of the path of travel of those conveyors. It will be apparent that this arrangement causes the conveyors 58 and 59 to be pulled along the top side thereof rather than pushed, as would be the case if the endless conveyors were driven through the shaft 45. Therefore, a positive driving pull is applied to the endless conveyors even though the prime mover for supplying power thereto is located adjacent the inlet end of the apparatus, that end being adjacent bottle handling equipment with which the apparatus is associated.

Bottles deposited upon the conveyors 58 and 59 at the inlet end thereof are supported by the metal links 60, and the movement of the bottles therealong is guided by the rails 43 and 44 which prevent bottles being dropped laterally from the endless conveyors.

As the conveyors 58 and 59 move through their path of travel, they engage the applicator wheels or rollers 68 and 69, and rotation of those rollers causes a quantity of liquid to be carried upwardly from the container 65 and to be deposited upon the endless conveyors. The applicator rollers or wheels are rotated through the frictional engagement between the circumferential surfaces of those rollers and the links 60 of the conveyors.

The drive chain 12 is entrained about the take-up and guide sprocket 13 which is positioned with respect to the driven sprocket 52 so as to keep the chain 12 in mesh therewith. The spring 24 tends to draw the arm 23 upwardly which, since it is connected to the arm 16, tends to pivot that arm downwardly about the pivotal axis 18 thereof. Thus, any slack within the drive chain 12 is taken up, and that chain is held in mesh with the driven sprocket 52. If the drive sprocket 10 is moved generally downwardly, the guide and take-up sprocket is held in engagement therewith by the spring 24 which tends to pivot the bell crank 16—23 about the shaft 18 so as to move the take-up sprocket 13 downwardly. On the other hand, if the drive sprocket 10 is moved generally upwardly along the lines of the arrows in Figure 2, the bell crank 16—23 will be pivoted against the biasing action of the spring 24 so as to permit the take-up sprocket 13 to move generally upwardly along the path of movement of the drive sprocket 10. Thus, the take-up sprocket 13 is effective to keep the drive chain 12 taut, yet at the same time is effective to maintain the drive chain in engagement with the driven sprocket wheel 52. The reason for this is the arcuate path of travel through which the sprocket 13 moves upon pivotal action of the bell crank 16—23, and that path of movement, as has been brought out, is generally along the path of movement of the drive sprocket 10.

While in the foregoing specification embodiments of this invention have been set forth in considerable detail for purposes of making a complete disclosure thereof, it will be apparent to those skilled in the art that numerous changes may be made in those details without departing from the spirit and principles of the invention.

I claim:

1. In a conveyor assembly, a frame, a pair of shafts rotatably supported in said frame one adjacent each end thereof and extending transversely thereacross, a pair of sprockets, one fixed to one of said shafts at the discharge end of the conveyor and the second rotatably carried by the other shaft at the feed end of the conveyor, an endless conveyor entrained about said sprockets, drive means adjacent the feed end of the conveyor for rotating the shaft rotatably carrying its sprocket, and means drivingly coupling said shafts whereby said endless conveyor is pulled by the sprocket affixed to its shaft.

2. The conveyor assembly of claim 1 in which said means comprises a pair of sprocket wheels, one fixed to each of said shafts, and an endless chain entrained thereabout.

3. In a conveyor assembly adapted to be driven from a drive sprocket of a separate spaced machine, a frame, a pair of shafts rotatably supported in said frame one adjacent each end thereof and extending transversely thereacross, a pair of sprockets, one fixed to one of said shafts and the second rotatably carried by the other shaft, an endless conveyor entrained about said sprockets, a sprocket wheel fixed to the aforesaid other shaft, a bell crank having a pair of arms and being pivotally carried by said frame at the point of juncture of said arms, a spring fixed to one of said arms and to said frame, an idler sprocket rotatably carried by the other arm, an endless chain entrained about said drive sprocket and idler sprocket and being in meshing engagement along one side thereof with said sprocket wheel, and means drivingly coupling said shafts whereby said endless conveyor is pulled by the sprocket affixed to its shaft.

4. The conveyor assembly of claim 1, in which said drive means comprises a sprocket and chain assembly, one sprocket of said drive means being mounted on said other shaft, an endless chain entrained about said last-mentioned sprocket and adapted to be driven by a drive sprocket of another machine movable relative to the conveyor assembly, said chain also being in engagement with a bell crank pivotally supported by said frame and having an idler sprocket carried by one arm thereof, spring means secured to said frame and to the other arm of said bell crank for biasing the same in a direction to move it away from said drive sprocket.

5. The conveyor assembly of claim 1, in which a container of lubricating material for said endless conveyor is positioned adjacent the return run of the conveyor and in which lubricating material-applying means are disposed within said container and in contact with said endless conveyor.

References Cited in the file of this patent

UNITED STATES PATENTS

| | | |
|---|---|---|
| 1,571,009 | Holzer | Jan. 26, 1926 |
| 1,888,309 | Cramer | Nov. 22, 1932 |
| 2,499,287 | Wilson | Dec. 28, 1950 |
| 2,543,563 | Appel | Feb. 27, 1951 |